(12) United States Patent
Silva et al.

(10) Patent No.: US 11,935,242 B2
(45) Date of Patent: Mar. 19, 2024

(54) CROP YIELD ESTIMATION

(71) Applicant: International Business Machines Corporation, Armonk, NY (US)

(72) Inventors: Bruno Silva, São Paulo (BR); Renato Luiz De Freitas Cunha, São Paulo (BR); Ana Paula Appel, São Paulo (BR); Eduardo Rocha Rodrigues, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 17/196,674

(22) Filed: Mar. 9, 2021

(65) Prior Publication Data
US 2021/0279867 A1 Sep. 9, 2021

Related U.S. Application Data

(60) Provisional application No. 62/987,218, filed on Mar. 9, 2020.

(51) Int. Cl.
*G06T 7/00* (2017.01)
*G06F 18/21* (2023.01)
(Continued)

(52) U.S. Cl.
CPC .............. *G06T 7/11* (2017.01); *G06F 18/217* (2023.01); *G06F 18/232* (2023.01);
(Continued)

(58) Field of Classification Search
CPC ........ G06V 20/17; G06V 20/13; G06V 20/20; G06V 20/38; G06V 20/39; G06F 18/00;
(Continued)

(56) References Cited

U.S. PATENT DOCUMENTS 6,505,146 B1 1/2003 Blackmer
2005/0234691 A1 10/2005 Singh et al.
(Continued)

FOREIGN PATENT DOCUMENTS

CN 102162850 A 8/2011
CN 104134095 A 11/2014
(Continued)

OTHER PUBLICATIONS

Paul Fearnhead and Hans R. Kunsch, "Particle Filters And Data Assimilation," arXiv:1709.04196v1 [stat.CO] Sep. 13, 2017, 31 pages.

(Continued)

*Primary Examiner* — Edward F Urban
*Assistant Examiner* — Duy Tran
(74) *Attorney, Agent, or Firm* — Patterson + Sheridan, LLP

(57) ABSTRACT

The present disclosure provides for crop yield estimation by identifying, via image processing, a field in which a crop is grown; identifying a plurality of regions within the field; identifying, by processing growth metrics via a model, a plurality of data collection points in the plurality of regions, wherein a given data collection point of the plurality of data collection points within a given region of the plurality of regions is identified by multivariate analysis as representative of growing conditions in the given region; receiving in-field data linked to the data collection points of the plurality; and predicting a yield for the crop in the field based on the in-field data.

20 Claims, 6 Drawing Sheets

(51) Int. Cl.
*G06F 18/232* (2023.01)
*G06K 9/00* (2022.01)
*G06K 9/46* (2006.01)
*G06K 9/62* (2022.01)
*G06T 7/11* (2017.01)
*G06V 20/10* (2022.01)
*G06V 20/17* (2022.01)

(52) U.S. Cl.
CPC .......... *G06T 7/0012* (2013.01); *G06V 20/17* (2022.01); *G06V 20/188* (2022.01); *G06T 2207/20081* (2013.01); *G06T 2207/30004* (2013.01); *G06T 2207/30188* (2013.01)

(58) Field of Classification Search
CPC ............. G06F 18/211; G06F 18/2337; G06F 18/2325; G06T 7/00; G06T 7/10; G06T 7/11; G06T 7/13; G06T 7/136; G06T 7/194; G06T 7/246; G06T 2207/30181; G06T 2207/30188; G06T 2207/30; G06T 2210/64
See application file for complete search history.

(56) References Cited

U.S. PATENT DOCUMENTS

| | | | |
|---|---|---|---|
| 2010/0306012 A1 | 12/2010 | Zyskowski et al. | |
| 2014/0012732 A1* | 1/2014 | Lindores | A01B 79/005 705/37 |
| 2016/0084813 A1* | 3/2016 | Anderson | G01N 33/025 702/5 |
| 2016/0224703 A1* | 8/2016 | Shriver | G06Q 10/0631 |
| 2016/0232621 A1* | 8/2016 | Ethington | G06Q 50/02 |
| 2016/0290918 A1 | 10/2016 | Xu et al. | |
| 2017/0351790 A1* | 12/2017 | Farah | G06Q 50/02 |
| 2018/0146624 A1* | 5/2018 | Chen | G05B 13/0265 |
| 2019/0019281 A1 | 1/2019 | Berghoefer et al. | |

FOREIGN PATENT DOCUMENTS

| | | |
|---|---|---|
| CN | 108985588 A | 12/2018 |
| CN | 109269475 A | 1/2019 |
| IN | 108205718 A | 6/2018 |
| JP | 2010166851 A | 8/2010 |
| WO | 2018081043 A1 | 5/2018 |

OTHER PUBLICATIONS

Pantazi et al., "Data Fusion of Proximal Soil Sensing and Remote Crop Sensing for the Delineation of Management Zones in Arable Crop Precision Farming," 7th International Conference on Information and Communication Technologies, Sep. 17-20, 2015.

Atkins et al., "Implicit particle methods and their connection with variational data assimilation," arXiv:1205.1830v1 [physics.data-an] May 8, 2012, 33 pages.

Soja, Agronegócio, "Estimando a produtividade na cultura da soja," Jan. 22, 2019, [Accessed Online Jul. 1, 2019] http://www.pioneersementes.com.br/blog/46/estimandoaprodutividadenaculturadasoja.

Matthas Morzfeld and Alexandre J. Chorin, "Implicit particle filtering for models with partial noise, and an application to geomagnetic data assimiation," arXiv:1109.3664 [math.NA], [v1] Fri, Sep. 16, 2011 17:05:00 UTC (1,338 KB).

* cited by examiner

US 11,935,242 B2

CROP YIELD ESTIMATION

CROSS-REFERENCE TO RELATED APPLICATIONS

This application is a Non-Provisional patent application of U.S. Provisional patent application Ser. No. 62/987,218, filed Mar. 9, 2020. The aforementioned related patent application is herein incorporated by reference in its entirety.

BACKGROUND

The present invention relates to artificial intelligence systems, and more specifically, to artificial intelligence systems for use in agriculture to manage and predict crop yields.

SUMMARY

According to one embodiment of the present invention, a method for crop yield estimation is provided, the method including: identifying, via image processing, a field in which a crop is grown; identifying a plurality of regions within the field; identifying, by processing growth metrics via a model, a plurality of data collection points in the plurality of regions, wherein a given data collection point of the plurality of data collection points within a given region of the plurality of regions is identified by multivariate analysis as representative of growing conditions in the given region; receiving in-field data linked to the data collection points of the plurality; and predicting a yield for the crop in the field based on the in-field data.

According to one embodiment of the present invention, a system for crop yield estimation is provided, the system including: a processor; and a memory storage device including processor executable instructions to perform an operation comprising: identifying, via image processing, a field in which a crop is grown; identifying a plurality of regions within the field; identifying, by processing growth metrics via a model, a plurality of data collection points in the plurality of regions, wherein a given data collection point of the plurality of data collection points within a given region of the plurality of regions is identified by multivariate analysis as representative of growing conditions in the given region; receiving in-field data linked to the data collection points of the plurality; and predicting a yield for the crop in the field based on the in-field data.

According to one embodiment of the present invention, a computer readable storage device including instructions for crop yield estimation is provided, such that when performed by a processor, the instructions enable the processor to: identify, via image processing, a field in which a crop is grown; identify a plurality of regions within the field; identify, by processing growth metrics via a model, a plurality of data collection points in the plurality of regions, wherein a given data collection point of the plurality of data collection points within a given region of the plurality of regions is identified by multivariate analysis as representative of growing conditions in the given region; receive in-field data linked to the data collection points of the plurality; and predict a yield for the crop in the field based on the in-field data.

DETAILED DESCRIPTION

In many agricultural practices, farmers grow plants of a given type in defined areas or fields (e.g., a field of crop A), but a given field may experience variations in conditions that affect the yield of that crop in one or more undefined regions that provide different growing conditions for the plants therein. For example, levels of irrigation, types of irrigation (e.g., channel, spray, drip, none/rain-only), soil acidity, soil drainage, the application of fertilizers, pest control schemes, altitude, daily temperatures, sun intensity, etc., can all affect how an individual plant grows and the yield of that plant, and can vary over the area of a given field. Knowing the field conditions and how representative plants are growing allows farmers to predict the yield for a crop and to make adjustments to thereby improve yields and make arrangements for the harvest of the crop (e.g., determine silo space needed, plan for time of harvest, locate distributors, plan for next seeding). However, identifying what individual plant is representative of other plants in a given area and what constitutes a region in which the plants are experiencing similar growing conditions is challenging, and can result in crop yield predictions that are inaccurate. The present disclosure therefore provides systems and methods for identifying regions in which plants are expected to experience similar growing conditions, and where representative specimens for a crop can be located to produce more accurate crop yield predictions. Additionally, the present disclosure manages the collection of in-field data on which to base the crop yield predictions and region determinations. The machine learning and crop simulation models employed herein (collectively referred to as models) can thus provide more accurate crop yield predictions based on better representative sampling, easier and faster data collection, and a finer-tuned estimation for growing areas.

Figure 1:
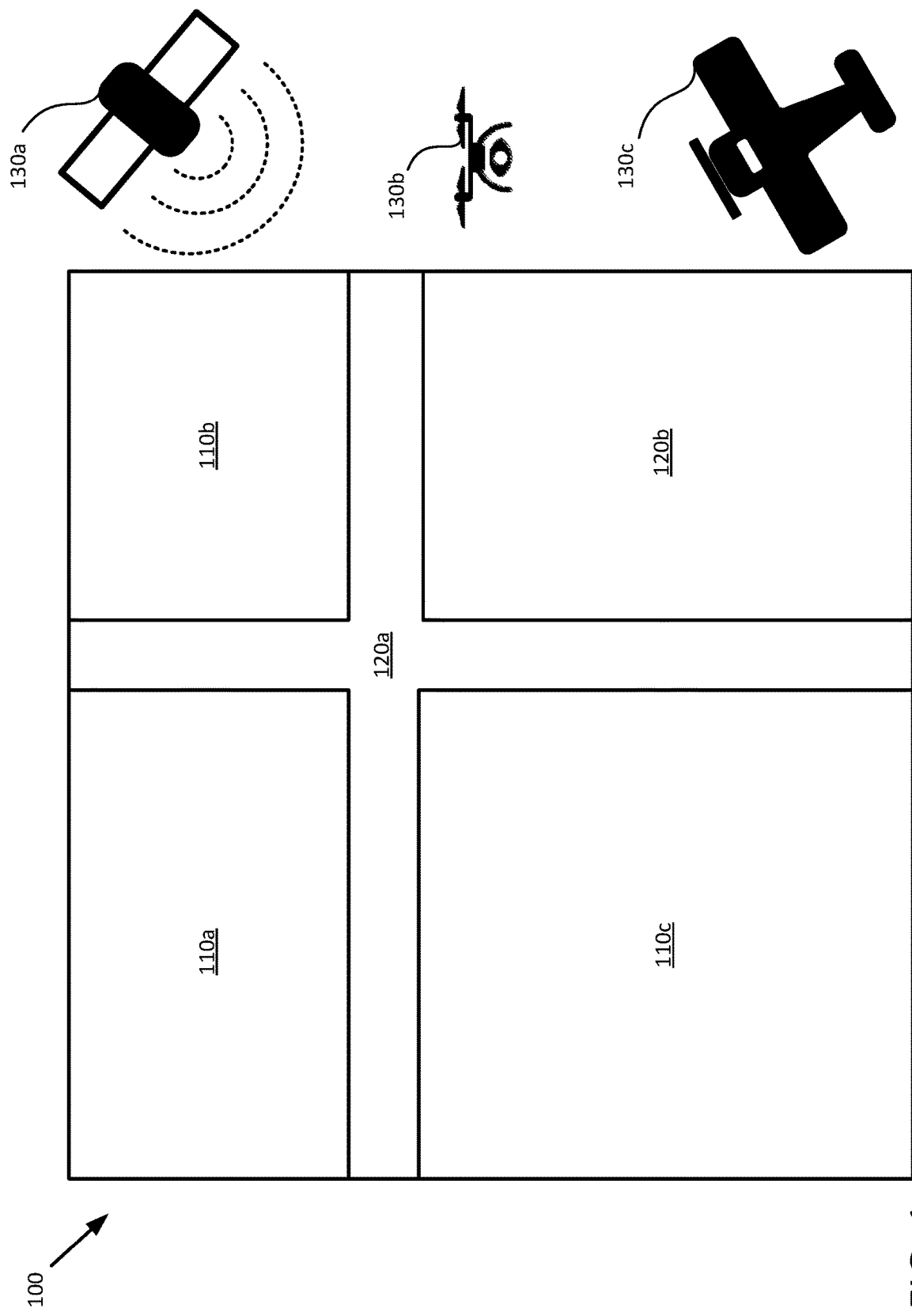
FIG. 1 illustrates a crop growing area, according to embodiments of the present disclosure.

FIG. 1 illustrates a crop growing area 100, according to embodiments of the present disclosure. As illustrated, the crop growing area 100 is subdivided into several defined zones including three fields 110*a-c* that are to be monitored for crop yield (generally, field 110) and two sectors 120*a-b* that are not to be monitored for crop yield (generally, sector 120). In various embodiments, a sector 120 may be an area that is not used for growing crops (e.g., a road, a residential area, a body of water, a building), an area used for growing a different crop than is grown in the fields 110, or an area that grows the same crop as in the fields 110, but has been disassociated from the fields 110 (e.g., a growing zone on a different cycle or having a different owner).

Three remote sensors 130*a-c* (generally, remote sensor 130), are illustrated in relation to the crop growing area 100 that provide remote sensing of various features of the fields 110 and sectors 120 therein. A remote sensor 130 may be a satellite imager (as in the first remote sensor 130*a*), a fully or semi-autonomous aerial imager or "drone" (as in the second remote sensor 130*b*), a piloted aerial imager (as in the third remote sensor 130c), or another system capable of capturing images of the crop growing area 100 that can be used to identify individual fields 110 or sectors 120 and/or conditions affecting or evidencing plant growth therein. These data may be combined to form a composite image from several remote sensors 130 that are collected as substantially the same time, or at substantially different times. For example, a swarm of several drone-type remote sensors 130 may be directed to collect remotely sensed data over the course of one day, which can be combined into a composite image and data set related to the day, which can further be combined with an earlier (or later) collected composite image or data set (e.g., collected by the swarm or a satellite on a different day).

A yield predictor identifies the crop growing area 100 in one or more images (e.g., a composite image) that are captured via the remotes sensors 130. In various embodiments, the yield predictor identifies defined zones in the crop growing area 100 by machine image processing, by geolocation coordination, or by manual selection. For example, the yield predictor may use coloration differences between portions of the crop growing field 110 used to grow plants and roadways, fences, barren areas, wild areas, residential areas and the like to identify different fields 110 and sectors 120 from the image of the crop growing area 100. Additionally, the yield predictor may coordinate geolocations in the images of the crop growing area 100 with property records or service sign-up forms to identify different fields 110 and sectors 120. For example, adjacent fields 110 that are not separated with a fence or other barrier, but belong to different farmers, may be identified by the property boundaries specified in a deed and identified geographical coordinates corresponding to portions of the image of the crop growing area 100.

Figure 2:
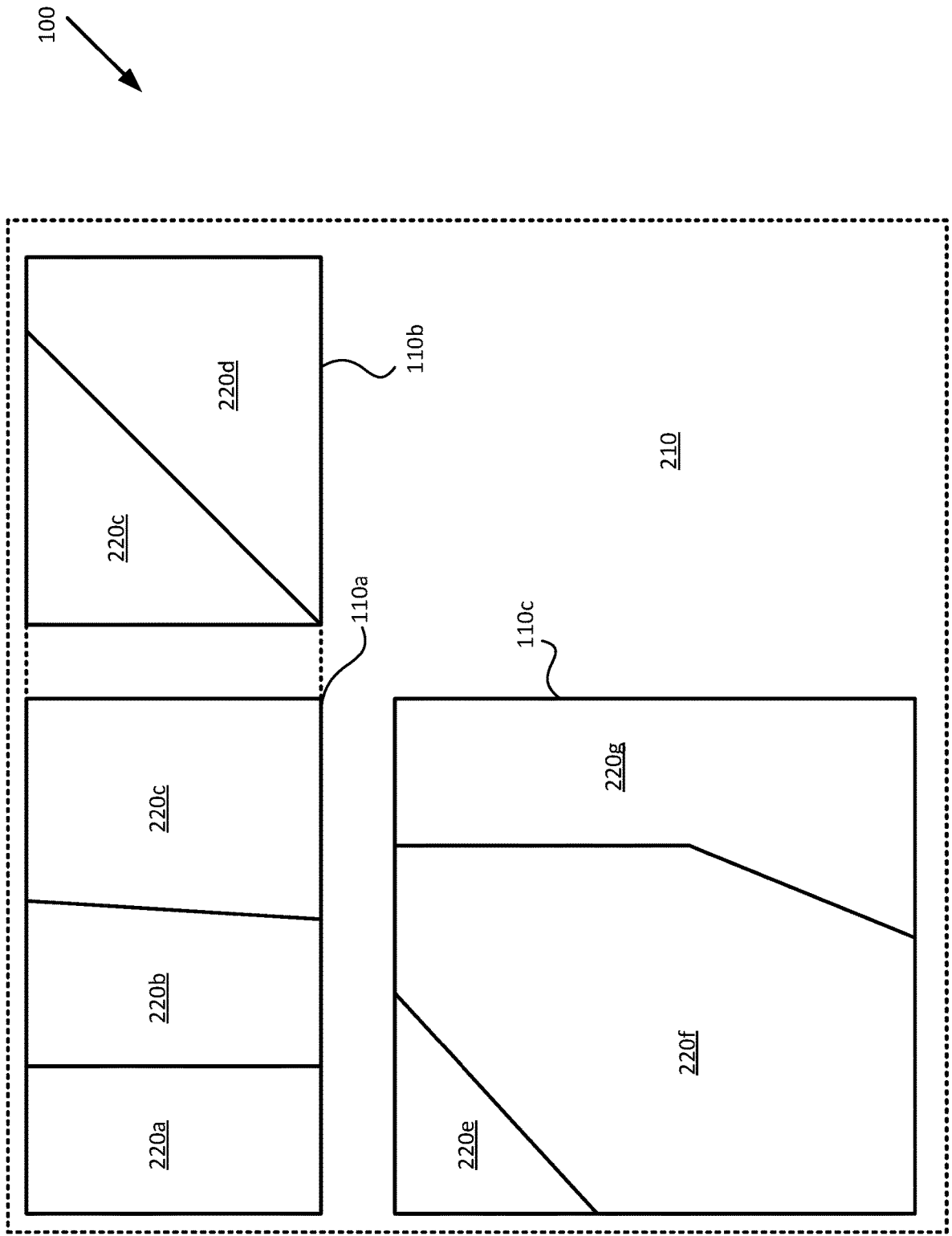
FIG. 2 illustrates a clustering of regions in a crop growing area, according to embodiments of the present disclosure.

FIG. 2 illustrates cluster identification in a crop growing area 100, according to embodiments of the present disclosure. As illustrated, the fields 110a-c are subdivided into several regions 220a-g (generally, region 220) that represent similar growing conditions; ignoring the non-analyzed areas 210 (including the various sectors 120 in the crop growing area 100).

In various embodiments, the regions 220 are differentiated from one another by identified conditions in the soil, growth patterns of plants therein, altitudes, or the like. A region 220 may represent a regularly or irregularly shaped subset of one or more fields 110, and various regions 220 may represent differently sized areas. For example, the first region 220a represents a first portion of the first field 110a that is a different size and shape than either the second region 220b from the first field 110a or the seventh region 220g from the third field 110c. In another example, the third region 220c includes portions of the first field 110a and the second field 110b that exhibit similar growing conditions.

The yield predictor identifies what qualifies as "similar growing conditions" based on the known characteristics of the field 110, which can include previously collected in-field data from the growth of the plants therein, physical features of the field 110, and image analysis of the field 110. For example, using one or more images of the fields 110, the yield predictor may identify a vegetation index using two or more spectral bands (e.g., the photosynthetically active radiation band and the near-infrared band) to identify where plants are growing and in what density. In another example, the yield predictor uses soil condition maps, topology maps, flood maps, climate/weather maps, and irrigation system schematics to identify areas that are expected to experience similar water and nutrient collection/retention characteristics. An operator may also provide data related to fertilization levels, pest control levels, and previously collected growth analysis data (e.g., at time to the density of plants per area, density of pods per plant, and density of seeds per pod were x, y, and z, respectively).

The yield predictor includes a machine learning model that is trained to use the characteristics of the field 110 to identify clusters of characteristics that define regions 220 in which similar growing conditions are expected. In various embodiments, the region-identifying machine learning model may be further constrained by the yield predictor to produce regions of a certain number, size, or general shape, to thereby aid data collection and differentiation. For example, a field 110 may be subdivided into two or more regions 220 of at least n hectares that describe the total area of the field 110, where different regions 220 describe portions of the field 110 where the plants are expected to have different growth patterns.

As will be appreciated, although the regions 220 describe specific boundaries within the field 110, the growth conditions may change gradually or blend between adjacent regions 220, but a region 220 describes an area where the yield for the crop is expected to fall within a given range of the average for the region 220. As additional data are received, the machine learning model may re-identify the borders of existing regions 220, may merge two or more regions 220 into a single region 220, split one region 220 into multiple regions 220, or completely re-cluster the fields 110 into new regions 220.

For example, the sections of the first region 220a and the second region 220b that border one another may exhibit the same yields as one another, and the sections of the second region 220b and third region 220c that border one another may also exhibit the same yields as one another, which are different than the yields at the border of the first and second regions 220a-b. Stated differently, yields may vary over the course of an individual region 220 more significantly than yields vary between adjacent portions of different regions; however, the yields within the individual region 220 are predicted to be within a given range of the average yield for that region 220 despite any variability therein. As data are collected for the regions 220, the machine learning model may update how different features are weighted and move the borders of the second region 220b (e.g., expanding the first region 220a and shrinking the second region 220b or vice versa) to better reflect the actual growth conditions in future predictions for regional yield.

Figure 3:
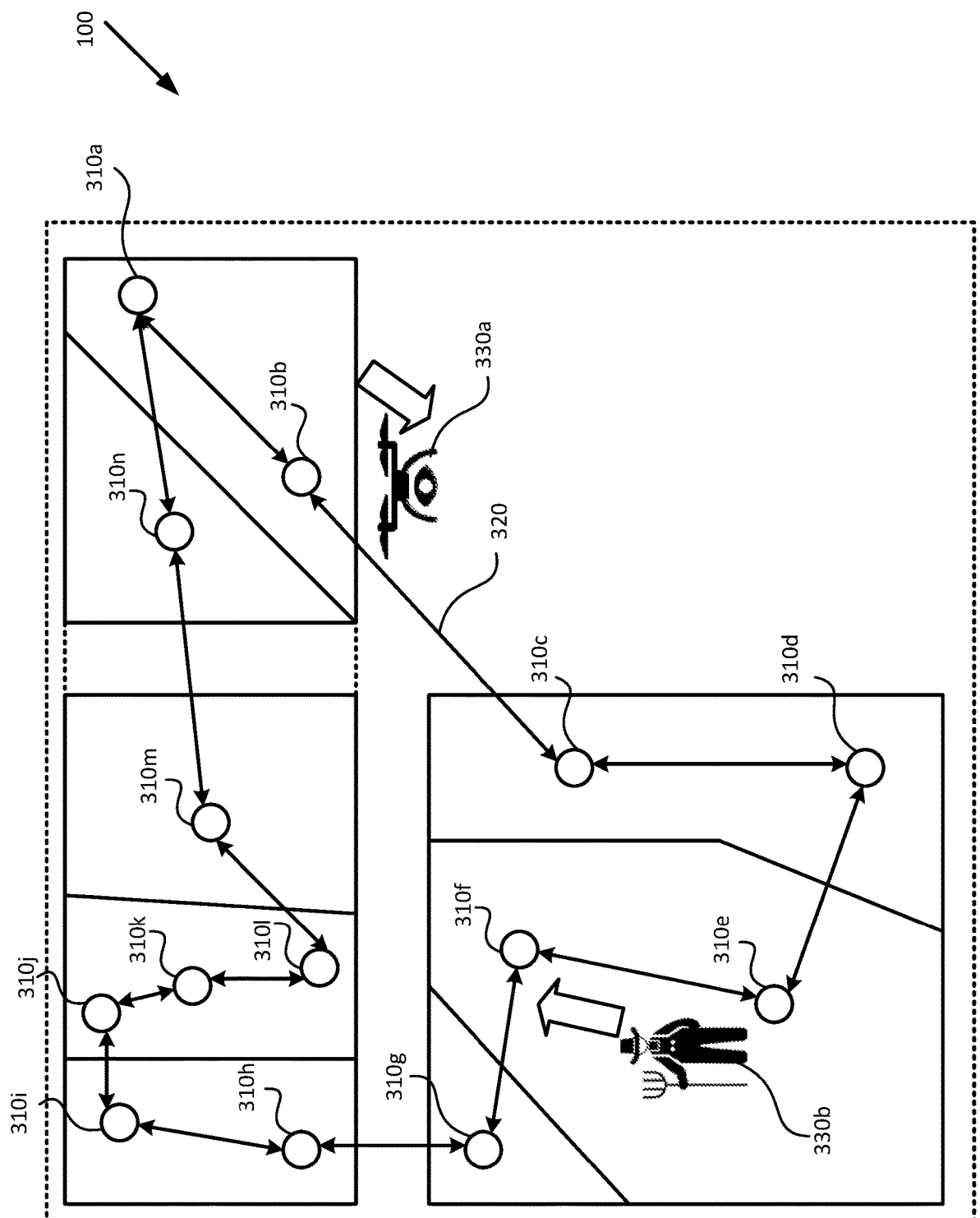
FIG. 3 illustrates in-field data collection points and pathing, according to embodiments of the present disclosure.

FIG. 3 illustrates in-field data collection points 310a-n (generally, data collection point 310) and pathing 320, according to embodiments of the present disclosure. After the yield predictor identifies the various regions 220 of the fields 110 to be analyzed (as in FIG. 2), one or more data collection points 310 are identified in each region 220 at which additional information related to the plants and/or soil conditions therein are to gathered. Also illustrated are a first data collector 330a (generally, data collector 330) and a second data collector 330b that are guides along the pathing 320 from data collection point 310 to data collection point 310 and instructed to collect various data about the fields 110 and crops growing therein at each data collection point 310. A data collector 330 may be an automated system (such as the first data collector 330a, which is illustrated as a flying drone) or a person (such as the second data collector 330b).

The yield predictor identifies at least one data collection point 310 per region 220, and may select the data collection point 310 to be the most representative point in the region. Stated differently, a data collection point 310 is selected to represent what the average growth conditions in the region 220 will produce. The yield predictor may impose further constraints on the selection of data collection points 310, such as, for example, a minimum or maximum distance to one or more other points (e.g., another data collection point 310, a border of a region 220, an irrigation system, a fence, a path), a minimum number of data collection points 310 per region 220, the relative locations of previously selected data collection points 310 (e.g., at least x meters away from where a previous measurement was gathered d days ago), and the like.

At each data collection point 310, the yield predictor may direct the data collector 330 to observe the same set or a different subset of plant, soil, or other environmental factors that may affect the yield of a crop. For example, a data collector 330 may photograph the plants at every data collection point 310, determine a plant density (e.g., number of plants per unit area), and count the number of pods, seeds, ears, flowers, etc. produced by those plants, but the yield predictor may direct the data collector 330 to take soil samples at a subset of the data collection points 310. Data collected at a data collection point 310 may include: pods/ears/flowers/fruits per plant, seeds per pod, weight per pod/ear/flower/fruit/seed, pod/ear/flower/fruit density per plant, leaves per plant, size of leaves (e.g., a leaf area index), shade of leaves (e.g., a vegetation index), vines/branches per plant, height of plants, plants per unit area, soil pH, soil texture/structure, soil temperature, air temperature, etc.

For example, when estimating the yield for a legume crop, such as soybeans, the yield predictor may extract features such as a vegetation index, leaf area index, pod density, and various soil properties which can be used to evaluate various regions 220 with respect to a yield estimate (e.g., in sacks per hectare), which may be produced according to Formula 1.

$$\text{Yield} = \frac{\text{Plants per area} * \text{Pods per plant} * \text{Seeds per pod} * \text{Weight of 1000 seeds}}{6000} \quad (1)$$

The yield predictor uses the collected data from the data collection points 310 to estimate the yields of each region 220 and to identify what effect the other characteristics have on the yield. When multiple data collection points 310 are included in each region 220, the yield predictor may use an average (mean) value for the data collected from the multiple data collection points 310 or may select one data collection point 310 to provide the data to be used in estimating yield for the region 220 (e.g., using additional data collection points 310 to verify remotely gathered data or provide additional feedback/training for the machine learning models). The yield predictor extrapolates the observed data from the data collection points 310 to the rest of the region 220, and may use kriging or a data-driven model to blend the estimates from neighboring regions 220 to arrive at a yield estimate for a field 110.

The data collection points 310 are linked together via pathing 320, which indicates a cost-reduced route to reach all of the identified data collection points 310. The cost-reduced route takes into account the mode of travel for the data collector 330 (e.g., walking through the fields 110, flying over the fields 110), the distances between data collection points 310 according to the mode of travel, and any obstacles present in the mode of travel (e.g., powerlines for flight, gates/fences/roads for ground-based travel) to identify the most efficient route to visit all of the identified data collection points 310. When multiple data collectors 330 are used, the pathing is split in a way that data collection can be the most efficient. One cost metric for such pathing may be to minimize the Euclidean distance traveled, but other metrics can be used for determining paths.

A data collector 330 may select to start at any of the identified data collection points 310 and move in one consistent direction between the data collection points 310. For example, a first data collector 330a that begins data collection at the second data collection point 310b may proceed "clockwise" to the third data collection point 310c, the fourth data collection point 310d, etc., or may proceed "counterclockwise" to the first data collection point 310a, the fourteenth data collection point 310n, etc. The pathing 320 may start and end at one data collection point 310 to define a closed route (e.g., starting and ending at the eighth data collection point 310h), or may start at one data collection point 310 and end at an adjacent data collection point 310 (e.g., at the second data collection point 310b or the fourteenth data collection point 310n when starting at the first data collection point 310a).

When multiple data collectors 330 are used at a given time, the yield predictor may assign separate subsets of the pathing to each data collector 330. The data collectors 330 may begin at the same data collection point 310 and be assigned alternate directions to proceed along the pathing 320, or may be assigned different starting points. In various embodiments, the yield predictor assigns subsets of the pathing 320 for an evenly distributed number of data collection points 310 to each data collector 330, for an evenly distributed cost of routing along the pathing 320 (e.g., so that the data collectors 330 finish the route at roughly the same time), or so that the data collectors 330 finish data collection at or near a shared pickup point for retrieval or exiting the fields 110.

Figure 4:
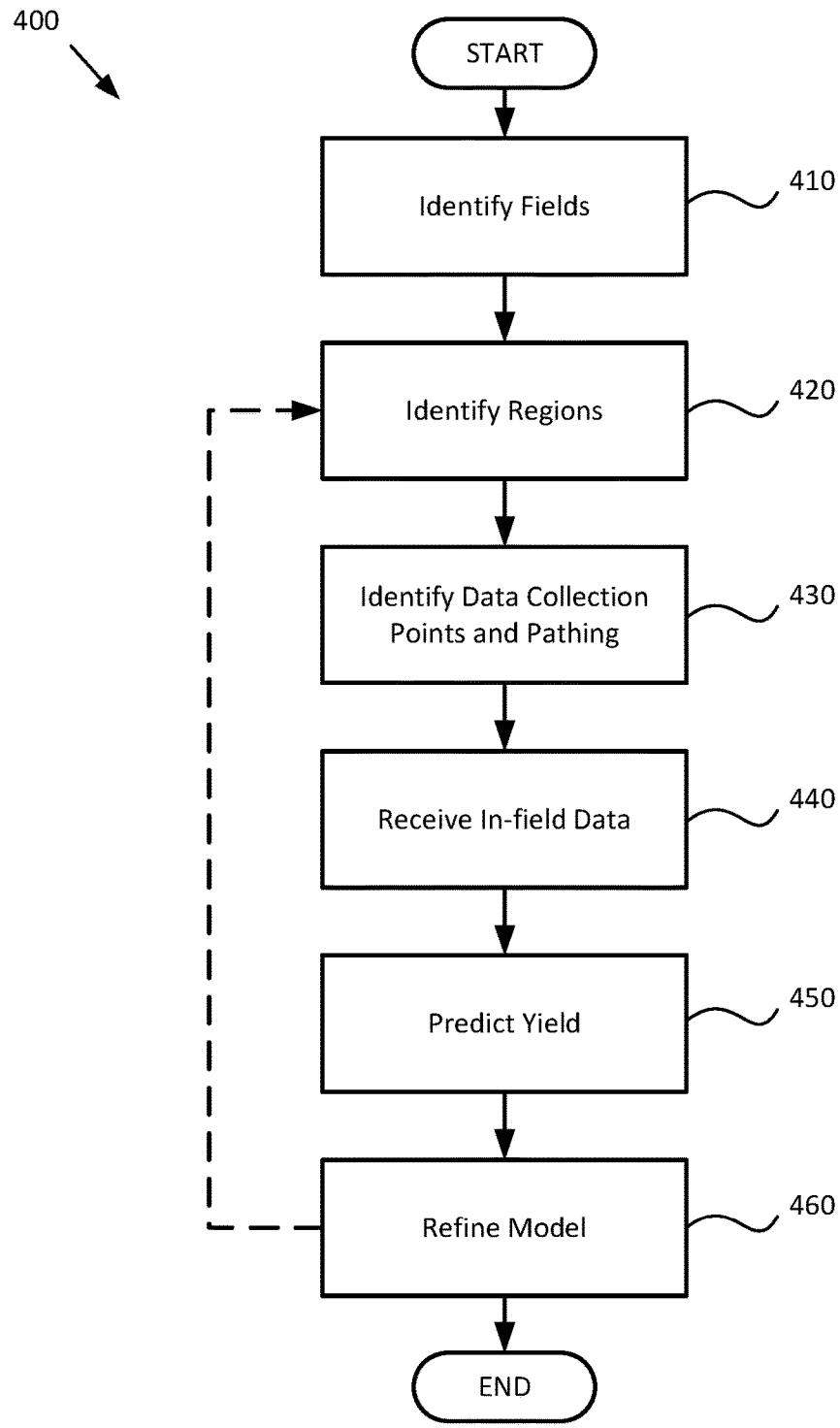
FIG. 4 is a flowchart of a method for crop yield estimation, according to embodiments of the present disclosure.

FIG. 4 is a flowchart of a method 400 for crop yield estimation, according to embodiments of the present disclosure. Method 400 begins at block 410, where the yield predictor identifies fields 110 to estimate the yield of crops planted therein. For example, Farms A and B may each designate certain defined zones thereof as being fields 110 that are dedicated to growing crop X. The yield predictor may identify the fields 110 in an image that includes the fields 110 (and one or more sectors 120 that are ignored) based on latitude and longitude coordinates specifying the fields 110, deed records identifying the metes and bounds of the fields 110, etc. Any zone outside of the designated coordinates for a field 110 to analyze, such as, for example, Farm C, park D, and roadway E, are treated as sectors 120 that the yield predictor may ignore regardless of whether crop X is present in those sectors 120.

At block 420, the yield predictor identifies regions 220 within the fields 110. The yield predictor uses known data for the field 110 to identify several regions 220 therein that are predicted to produce similar yields for the crop. The yield predictor uses a machine learning model trained to identify clusters of relevant criteria that affect crop yield. These criteria may be weighted differently from one another in the machine learning model, and can include one or more of: vegetation indexes visible in images of the field 110, soil conditions throughout the field 110 from previously collected data or soil maps, fertilizer application levels throughout the field 110 from previously collected data or operator reporting, pest control application levels throughout the field 110 from previously collected data or operator reporting, and previously collected vegetative growth and yield metrics from an earlier data collection iteration in the field 110.

In various embodiments, the yield predictor may constrain the machine learning model to produce no more than or at least a given number of regions 220, to produce regions 220 of at least a given size (e.g., a region 220 must be at least x hectares in area) or no greater than a given size (e.g., a region 220 must be less than y hectares in area), to produce regions 220 with perimeters of regular or irregular shapes, to produce regions 220 within a given perimeter-to-area ratio threshold, or the like.

At block 430, the yield predictor identifies data collection points 310 in the regions 220, and identifies a pathing 320 that links the data collection points 310. The data collection points 310 are identified in the regions 220 to be the most-representative for the growing conditions in a given region 220; the yield measurements taken at the data collection points 310 should be closer to the "average" values for the respective regions 220 than other points in the region 220. In various embodiments, the yield predictor may further constrain the machine learning model to produce data collection points 310 at least a given distance away from other data collection points 310, at least a given distance away from a feature in the field 110 (e.g., a border, an irrigation system, a sign, a fence, a path), the maximum and/or minimum number of data collection points 310 to include in a given region 220, the average number of data collection points 310 to include in a given region 220 for the area of the given region 220, at least a given distance away from the location of previously selected data collection points 310, and the like.

The pathing 320 is calculated to define a route for a data collector 330 to follow that efficiently directs the data collector 330 to each identified data collection point 310. The pathing 320 may be navigated in a specified direction or in either direction (e.g., the data collector 330 may choose to move "clockwise" or "counterclockwise"), may specify or allow the data collector 330 to choose a first data collection point 310, and may be open or closed. The yield predictor identifies the pathing 320 according to the lowest cost route determined by a cost-function associated with the movement type of the data collector 330 between the data collection points 310. For example, when the data collector 330 is a person who walks from data collection point 310 to data collection point 310, the cost-function may account for fences, hills, gates, roadways and other obstructions to the walked route (e.g., minimizing paths across roads, directing paths through gates and not through fences, directing paths around instead of over hills). In another example, when the data collector 330 is a drone that flies from data collection point 310 to data collection point 310, the cost-function may account for trees, power lines, wind turbines, wind patterns (including updrafts), bird nesting sites, and other aerial navigation hazards to identify an efficient route to navigate.

In various embodiments, the information for the pathing 320 is sent to the data collector 330 to navigate to an initial or subsequent data collection point 310 and to collect specific data at that data collection point 310. For example, the data collector 330 may be instructed to take a photograph of the plants located at the data collection point 310, which the yield predictor analyzes to extract various data about how the plants are growing at the data collection point 310 (e.g., leaf size, number of leaves, number of fruiting bodies, size of fruiting bodies, estimated content of fruiting bodies, density of plants per area, plant height). In other embodiments, the data collector 330 may specify data values regarding the plants (e.g., leaf size, number of leaves, number of fruiting bodies, size of fruiting bodies, estimated content of fruiting bodies, density of plants per area, plant height), the soil (e.g., pH, grain size, moisture content, temperature), air (e.g., temperature, pollen/particulate count, humidity), and treatments applied to the data collection point 310 (e.g., fertilizers, pesticides), and the like. The yield predictor associates the measurements taken at each data collection point 310 with the coordinates for that data collection point 310.

At block 440, the yield predictor receives in-field data that are linked to the data collection points 310 from the data collector 330. In various embodiments, the data collector 330 may be one of several individual data collectors 330 working in tandem to provide data collected at the various data collection points 310. The data may be received in real-time or near real-time as the data are collected from each data collection point 310, or may be uploaded in a batch for a given field 110 of set of fields 110 when a data collector 330 returns to a data upload station.

At block 450, the yield predictor predicts the yield for the fields 110. The yield predictor may apply one or more yield estimation formulas that use the collected vegetative or yield metrics collected from the data collection points 310 to estimate how productive each region 220 in the field 110 will be when harvest occurs. For example, with a legume crop, the density of plants in the data collection point 310, the number of pods per plant, the number of seeds per pod, and the average weight of the seeds for the given legume can be extrapolated for the region 220 to estimate how much the region 220 will produce. In various embodiments, the yield predictor may separate the output yields for multiple fields 110 for which data was collected in one iteration. For example, if a data collector 330 is directed to collect data from a first field 110a belonging to farmer A and a second field 100b belonging to farmer B in one data collecting trip, the yield predictor may produce a first yield estimate for farmer A related to the first field 110a and a second yield estimate for farmer B related to the second field 110b. In various embodiments, the data collected in the one data collection trip may be used to improve the estimation for multiple fields 110, so that the estimate for one field 110 may include data gathered from or in conjunction with another field 110, so that, for example, one region 220 can span multiple fields 110, but the resulting yield estimates are kept distinct and private for a given field 110 and the associated farmer.

At block 460, the yield predictor refines the machine learning models and crop simulation models used in analyzing the crop yields. In some embodiments, the yield predictor performs a regression analysis of growing condition data (from the in-field data collected from the data collection points 310, from image analysis of the fields 110, and from mapped data sources) to the yield related data (i.e., the data directly related to crop production per unit area in a region 220) to identify relationships and relative effects of soil conditions, elevation, irrigation types and volumes, fertilizer types and levels, pest control types and levels, vegetation indices, daily temperatures, sun intensity, etc., on the output of the plants in the region 220. In additional embodiments, the yield predictor uses one or more intermediate models to output intermediate crop development metrics for use by other models when predicting the yield, and refines those models when in-field data are available to compare against. For example, intermediate models may be used to identify one or more of a leaf area index, a development stage for the crop, a dry weight of the crop (e.g., of a grain or legume), a number of seeds/pods/ears/fruiting bodies per plant, etc. Using the identified characteristics from the regression analysis, the yield predictor refines the models used to identify regions 220 and data collection points 310 by adjusting the weights assigned to the various inputs. By refining the models, the yield predictor improves the outputs of the machine learning models so that in a next iteration the models will identify new regions 220 to describe the fields 110, new data collection points 310 in the fields 110, and/or how to model the growth conditions in the field 110.

Method 400 may conclude after block 460, or may return to block 420, where the newly refined models identify a new set of regions 220 that more accurately represent the average production of the crop growing in those fields 110 than in previous iterations. Method 400 may iterate several times throughout a growing season at periodic intervals (e.g., every d days), at an operator's request, (using one data set) until the machine learning models converge on a stable set of weights for the input features, or until another end condition is satisfied.

Figure 5:
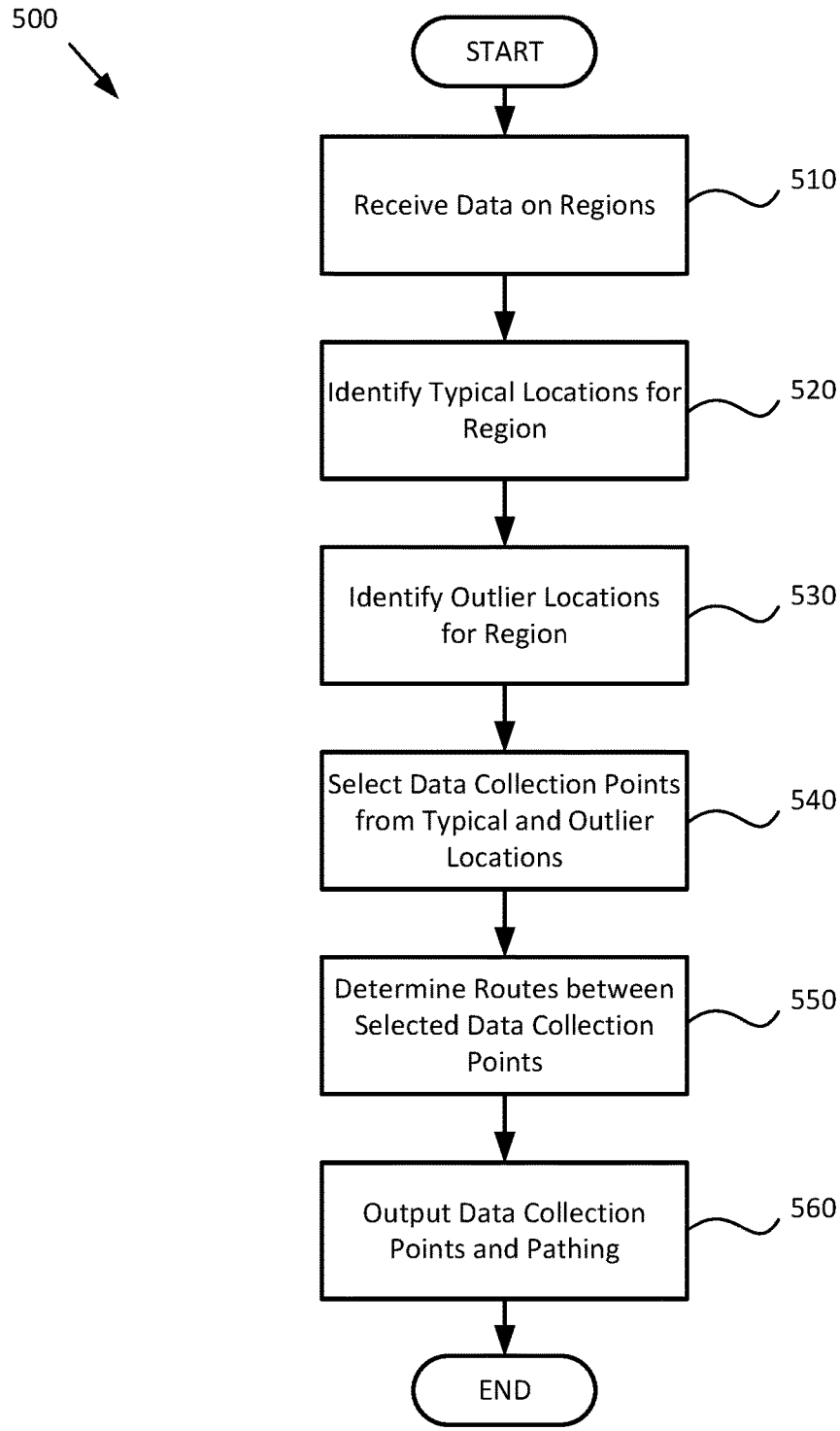
FIG. 5 is a flowchart of a method for identifying the "best" data collection points and the pathing therebetween, according to embodiments of the present disclosure.

FIG. 5 is a flowchart of a method 500 for identifying the "best" data collection points 310 and the pathing 320 therebetween, according to embodiments of the present disclosure. In some embodiments, method 500 is performed as block 430 of method 400.

Method 500 begins with block 510, where a field analyzer receives data related to each region 220 in which crop yields are to be predicted. The field analyzer is a machine learning model that is trained to identify locations in the regions 220 to specify as data collection points 310. The field analyzer identifies locations that present the most typical combination (for a given region 220) set of two or more growth metrics that affect crop yield. For example, the field analyzer may receive data related to different growth metrics including: levels of irrigation, types of irrigation (e.g., channel, spray, drip, none/rain-only), soil conditions (e.g., soil pH, soil drainage, soil type (e.g., sand, clay, loam)), fertilizer application levels, pest control schemes and levels of application, altitudes, daily temperatures, sun intensity, etc. These data may be identified from a machine image processing of images of the fields 110, map data (e.g., soil condition maps, topology maps, flood maps, climate/weather maps), and data previously collected by data collectors 330 from the fields 110.

At block 520, the field analyzer identifies, based on the received data, locations that embody typical values for two or more of the different growth metrics. In various embodiments, the field analyzer is trained to identify what qualifies as "typical" for different growth metrics based on different standard deviations from the mean value for those metrics within a given region 220. For example, in a multivariate analysis with growth metrics related to vegetation index, soil pH, and soil moisture content, the field analyzer may determine that any vegetation index value within one standard deviation (i.e., 1a) qualifies as typical, any soil pH value within two standard deviations (2b) qualifies as typical, and any soil moisture content value within half a standard deviation (0.5b) qualifies as typical. Accordingly, the field analyzer identifies all the locations in the region 220 that qualify as typical for all of the measured growth metrics as candidate data collection points 310 for the associated region 220.

In some embodiments, the field analyzer uses a first growth metric to identify two or more other growth metrics to use in identifying the typical growing conditions for a region 220. For example, the field analyzer may use a soil type classification (e.g., sand, clay, loam) or other qualitative or non-numeric growth metric to select a two or more quantitative growth metrics to analyze and/or the ranges of those metrics that qualify as typical. For example, the standard deviation that qualifies for "typical" for a given growth metric may vary in regions where the soil type classification is different, where the irrigation type is different (e.g., drip vs. spray vs. none/rain only), etc.

At block 530, the field analyzer identifies locations that correspond to outliers in the received and clustered data. The outliers may be identified based on individual growth metrics or the collective growth metrics used to identify the typical locations, and may be of limited or ongoing interest in estimating crop yield. For example, a location that is typical in all respects except for vegetation index value may be due to several factors with different effects on the crop yield estimation. In one instance, the vegetation index may have been gathered when farm equipment was present in the field 110, and the outlier location may be an outlier due to the farm equipment obscuring the crop from the view of the remote sensor 130, and can be included in the area of the region 220 used for yield predictions. In another instance, the variance in vegetation index may be due to an ongoing factor that may reduce the area of the region 220 that is used for yield predictions (e.g., the location corresponds to a well head, a pivot for an irrigation system, an area around a salt lick, the footprint of a wind turbine or other permanent fixture in the field 110, etc.). Accordingly, the field analyzer may identify all the locations in the region 220 are outliers as candidate data collection points 310 for the associated region 220; however, these candidate outlier data points are treated differently than the candidate typical data points (identified per block 520) by the field analyzer and the yield predictor.

At block 540, the field analyzer selects a specified number and layout of data collection points 310 (both typical and outlier) according to the constraints for the given crop growing area 100 under analysis. The constraints may indicate that a given number (or range of numbers) of data collection points 310 are to be selected for a given region 220 (e.g., exactly one, at least one, between n and m) as well as rules for how close together data collection points 310 may be relative to other data collection points 310 in a current iteration, data collection points 310 from previous iterations, borders of regions 220, etc.

In various embodiments, the field analyzer selects the most typical point in a given region 220 for use as the data collection point 310 (e.g., the location that is the closest to average across as many criteria as possible, or has a lowest weighted average total deviation from the respective mean values for all or a subset of the criteria analyzes) to use when estimating the yield of a region. In other embodiments, such as when the "most typical" point violates a constraint, the field analyzer identifies a different location that is also considered "typical" to use as the data collection point 310 used in estimating the crop yield.

In various embodiments, the field analyzer selects one or more locations indicated as outliers for use as data collection points 310. In some embodiments, data collected from the data collection points 310 associated with outlier locations may be omitted or ignored when estimating the crop yield, but can be used in training the yield predictor for identifying various regions 220. In other embodiments, these data collection points 310 may be used to alter the area considered to be available for growing crops in the region 220.

At block 550, the field analyzer determines one or more routes between the identified data collection points 310. The field analyzer generates a number of routes that depending on the number of data collectors 330 assigned to collect data from the data collection points 310. For example, the field analyzer uses a cost-reducing function to identify the shortest or most efficient pathing between all of the data collection points 310 assigned to a given data collector 330 based on the movement type (e.g., walking, flying, wheeled) of the data collector 330 and the obstacles present in the crop growing area 100. For example, the route selected for a person walking between data collection points 310 may account for changes in elevation, gates in fences, roadways, buildings and the like, whereas the route selected for an aerial drone flying between data collection points 310 may account for trees, power lines, wind turbines, wind patterns (including updrafts), bird nesting sites, and other aerial navigation hazards.

At block 560, the field analyzer outputs the data collection points 310 and the pathing 320. Method 500 may then conclude.

Figure 6:
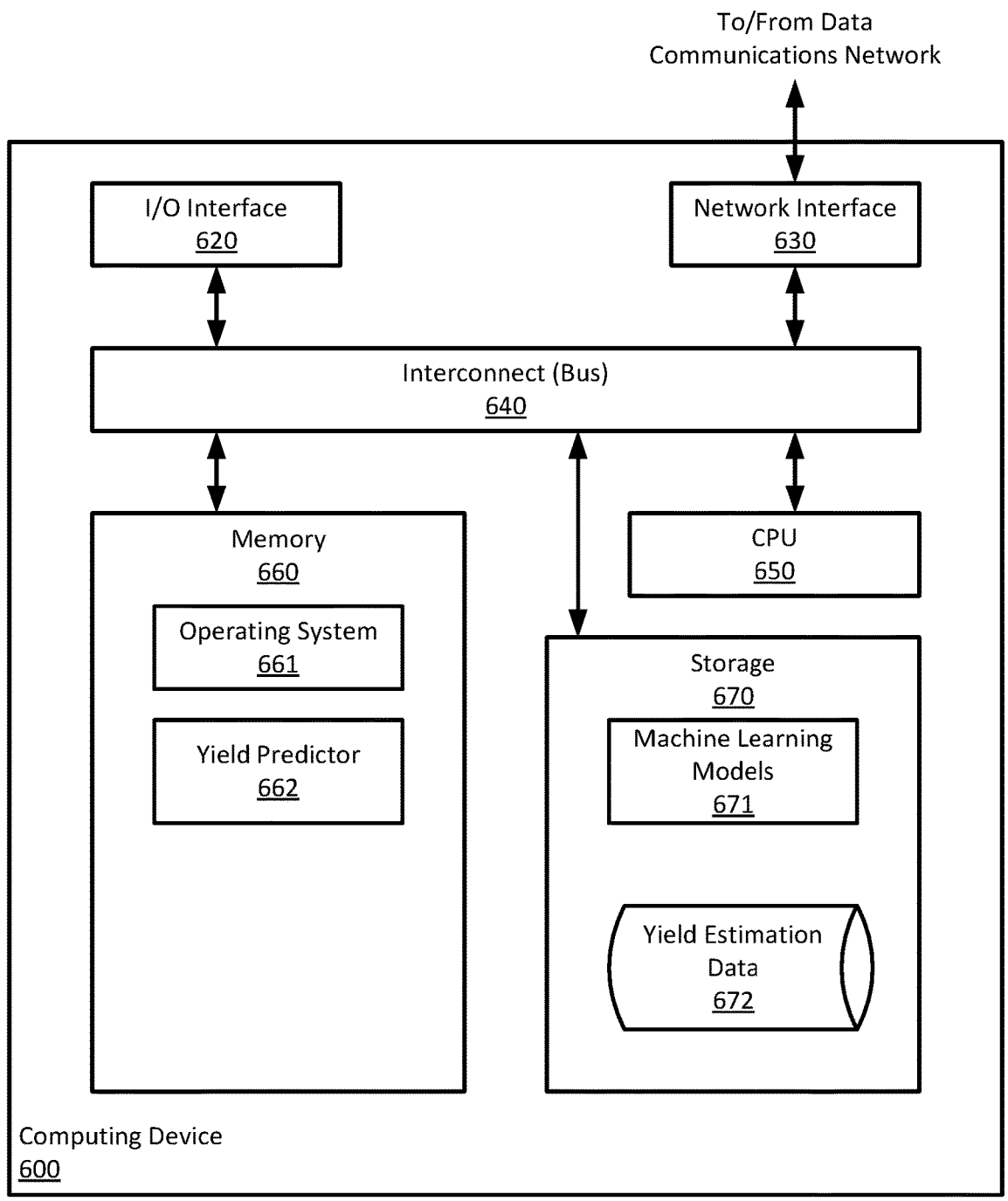
FIG. 6 illustrates components of a computing device, according to embodiments of the present disclosure.

FIG. 6 illustrates a computing system 600, which may be a personal computer, a laptop, a tablet, a smartphone, etc. As shown, the computing system 600 includes, without limitation, a central processing unit (CPU) 650, a network interface 630, an interconnect 640, a memory 660, and a storage 670. The computing system 600 may also include an I/O device interface 620 connecting I/O devices 610 (e.g., keyboard, display and mouse devices) to the computing system 600.

The CPU 650 retrieves and executes programming instructions stored in the memory 660. Similarly, the CPU 650 stores and retrieves application data residing in the memory 660. The interconnect 640 facilitates transmission, such as of programming instructions and application data, between the CPU 650, I/O device interface 620, storage 670, network interface 630, and memory 660. The CPU 650 is included to be representative of a single CPU, multiple CPUs, a single CPU having multiple processing cores, and the like. And the memory 660 is generally included to be representative of a random access memory. The storage 670 may be a disk drive storage device. Although shown as a single unit, the storage 670 may be a combination of fixed and/or removable storage devices, such as magnetic disk drives, flash drives, removable memory cards or optical storage, network attached storage (NAS), or a storage area-network (SAN). The storage 670 may include both local storage devices and remote storage devices accessible via the network interface 630. One or more machine learning models 671 are maintained in the storage 670 to cluster areas of fields 110 into regions 220, identify data collection points 310 within the regions 220, and identify pathing 320 between the data collection points 310 according to cost function models for how collectors move between the data collection points 310. The storage 670 may also include a database of yield estimation data 672 containing (or linking to) the data collected from the fields 110, images of the fields 110, and map or boundary data about the fields 110 that are used by the machine learning models 671 when identifying regions 220, data collection points 310, and pathing 320.

Further, the computing system 600 is included to be representative of a physical computing system as well as virtual machine instances hosted on a set of underlying physical computing systems. Further still, although shown as a single computing system, one of ordinary skill in the art will recognize that the components of the computing system 600 shown in FIG. 6 may be distributed across multiple computing systems connected by a data communications network.

As shown, the memory 660 includes an operating system 661 (e.g., the WINDOWS® Operating System, available from Microsoft Corp. of Redmond, Wash.) and a yield predictor application 662. The yield predictor application 662, which includes a field analyzer, directs the identification and data collection from the fields 110, and produces a yield estimate for the fields 110. Additionally, the yield predictor application 662 directs the retraining and refinement of the machine learning models 671 based on additional or newer data and provides the output of yield predictions, data collection points 310, and pathing 320 to data collectors 330, field operators, and other parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   identifying, via image processing, a field in which a crop is grown;
   identifying a plurality of regions within the field based on determining that locations within each respective region of the plurality of regions are predicted to produce similar crop yields;
   identifying, for each respective region in the plurality of regions, a respective set of data collection points in the respective region by processing one or more growth metrics using a model, wherein the respective set of data collection points is identified as corresponding to typical locations in the respective region, based on multivariate analysis of growing conditions in the respective region;
   receiving at a first time, in-field data linked to the sets of data collection points of the plurality of regions; and
   predicting a yield for the crop in the field at a harvest time based on the in-field data at the first time.

2. The method of claim 1, further comprising:
   identifying a path for a data collector to reach the sets of data collection points according to a lowest cost according to a cost-function associated with a movement type of the data collector between each data collection point of the sets of data collection points.

3. The method of claim 1, wherein the plurality of regions describe zones of the field in which the yield of the crop are predicted to be clustered based on the growth metrics, which include one or more of:
vegetation indexes visible in images of the field;
soil conditions throughout the field;
fertilizer application levels throughout the field; and
pest control application levels throughout the field.

4. The method of claim 3, further comprising:
refining the model used to identify the plurality of regions to identify a plurality of new regions within the field, wherein the new regions are identified based on a clustering of the in-field data collected from the plurality of regions.

5. The method of claim 3, further comprising:
outputting an intermediate crop development metric via an intermediate model according to a plurality of parameters and the in-field data, wherein the intermediate crop development metric indicates a progress of the crop;
refining the plurality of parameters of the intermediate model according to the in-field data; and
wherein the intermediate crop development metric is related to one or more of:
a leaf area index;
a development stage;
a dry weight; and
a number of seeds per plant.

6. The method of claim 1, further comprising:
identifying a second field in which the crop is grown;
identifying a second plurality of regions within the second field;
identifying a set of data collection points in the second plurality of regions;
receiving second in-field data linked to the data collection points of the set of data collection points in the second plurality of regions; and
predicting a second yield for the crop in the second field based on the second in-field data and the yield predicted for the field.

7. The method of claim 6, wherein a first given region of the plurality of regions is linked to a second given region of the second plurality of regions as a single region that spans the field and the second field.

8. A system comprising:
a processor; and
a memory storage device including processor executable instructions to perform an operation comprising:
identifying, via image processing, a field in which a crop is grown;
identifying a plurality of regions within the field based on determining that locations within each respective region of the plurality of regions are predicted to produce similar crop yields;
identifying, for each respective region in the plurality of regions, a respective set of data collection points in the respective region by processing one or more growth metrics using a model, wherein the respective set of data collection points is identified as corresponding to typical locations in the respective region, based on multivariate analysis of growing conditions in the respective region;
receiving at a first time, in-field data linked to the sets of data collection points of the plurality of regions; and
predicting a yield for the crop in the field at a harvest time based on the in-field data at the first time.

9. The system of claim 8, the operation further comprising:
identifying a path for a data collector to reach the sets of data collection points according to a lowest cost according to a cost-function associated with a movement type of the data collector between each data collection point of the sets of data collection points.

10. The system of claim 8, wherein the plurality of regions describe zones of the field in which the yield of the crop are predicted to be clustered based on one or more of:
vegetation indexes visible in images of the field;
soil conditions throughout the field;
fertilizer application levels throughout the field; and
pest control application levels throughout the field.

11. The system of claim 10, the operation further comprising:
refining the model used to identify the plurality of regions to identify a plurality of new regions within the field, wherein the new regions are identified based on a clustering of the in-field data collected from the plurality of regions.

12. The system of claim 10, the operation further comprising:
outputting an intermediate crop development metric via an intermediate model according to a plurality of parameters and the in-field data, wherein the intermediate crop development metric indicates a progress of the crop;
refining the plurality of parameters of the intermediate model according to the in-field data; and
wherein the intermediate crop development metric is related to one or more of:
a leaf area index;
a development stage;
a dry weight; and
a number of seeds per plant.

13. The system of claim 8, the operation further comprising:
identifying a second field in which the crop is grown;
identifying a second plurality of regions within the second field;
identifying a set of data collection points in the second plurality of regions;
receiving second in-field data linked to the data collection points of the set of data collection points in the second plurality of regions; and
predicting a second yield for the crop in the second field based on the second in-field data and the yield predicted for the field.

14. The system of claim 13, wherein a first given region of the plurality of regions is linked to a second given region of the second plurality of regions as a single region that spans the field and the second field.

15. A computer readable storage device including instructions that when performed by a processor, enable the processor to:
identify, via image processing, a field in which a crop is grown;
identify a plurality of regions within the field based on determining that locations within each respective region of the plurality of regions are predicted to produce similar crop yields;

identify, for each respective region in the plurality of regions, a respective set of data collection points in the respective region by processing one or more growth metrics using a model, wherein the respective set of data collection points is identified as corresponding to typical locations in the respective region, based on multivariate analysis of growing conditions in the respective region;

receive, at a first time, in-field data linked to the sets of data collection points of the plurality of regions; and predict a yield for the crop in the field at a harvest time based on the in-field data at the first time.

16. The computer readable storage device of claim 15, wherein the instructions, when performed, further enable the processor to:

identify a path for a data collector to reach the sets of data collection points according to a lowest cost according to a cost-function associated with a movement type of the data collector between each data collection point of the sets of data collection points.

17. The computer readable storage device of claim 15, wherein the plurality of regions describe zones of the field in which the yield of the crop are predicted to be clustered based on one or more of:

vegetation indexes visible in images of the field;
soil conditions throughout the field;
fertilizer application levels throughout the field; and
pest control application levels throughout the field.

18. The computer readable storage device of claim 17, wherein the instructions, when performed, further enable the processor to:

refine the model used to identify the plurality of regions to identify a plurality of new regions within the field, wherein the new regions are identified based on a clustering of the in-field data collected from the plurality of regions.

19. The computer readable storage device of claim 17, wherein the instructions, when performed, further enable the processor to:

output an intermediate crop development metric via an intermediate model according to a plurality of parameters and the in-field data, wherein the intermediate crop development metric indicates a progress of the crop;

refine the plurality of parameters of the intermediate model according to the in-field data; and wherein the intermediate crop development metric is related to one or more of:

a leaf area index;
a development stage;
a dry weight; and
a number of seeds per plant.

20. The computer readable storage device of claim 15, wherein the instructions, when performed, further enable the processor to:

identify a second field in which the crop is grown;
identify a second plurality of regions within the second field;
identify a set of data collection points in the second plurality of regions;
receive second in-field data linked to the data collection points of the set of data collection points in the second plurality of regions; and
predict a second yield for the crop in the second field based on the second in-field data and the yield predicted for the field.

* * * * *